Patented Feb. 2, 1937

2,069,564

UNITED STATES PATENT OFFICE 2,069,564

STABILIZING BASE EXCHANGING HUMATES

Howard L. Tiger, New York, N. Y., and Paul C. Goetz, Mount Holly, N. J., assignors to The Permutit Company, New York, N Y., a corporation of Delaware No Drawing. Application July 31, 1935, Serial No. 34,108

13 Claims. (Cl. 210—24)

This invention relates to stabilizing base exchanging humates; and it comprises a process of stabilizing humic materials for use in water treatment to prevent or reduce color contamination of the treated water wherein the humic material is preliminarily treated with a solution of a chromic salt and thus charged with chromium-containing humates; and it further comprises a manufactured base exchange material containing one or more humic acid compounds and stabilized against color discharge by a substantial content of $Cr_2O_3$ in chemical combination in a form irremovable by water; all as more fully hereinafter set forth and as claimed.

"Humus" and "humic acid" are well recognized terms for characteristic organic matters which occur in soils and are capable of combining with bases to form the various humates. The same substances occur in the younger coal or brown coals of the lignite type and in modified form in the older coals; soft coal types. In the soil and in the coal the humic acid is in combination with various bases among which CaO and MgO, $Fe_2O_3$ and $Al_2O_3$ are generally included. As is well known, the humus or humic acid in the soil has base exchange properties and commercial base exchange preparations for softening water, etc., have been made from lignite. In some recent work, the humic constituents of lignite, etc. have been treated with sulfuric acid in various ways to make sulfated and sulfonated preparations of increased base exchange power.

These humic acid materials, or base exchanging humates, as they may be called, have high base exchange capacities, including a power of removing bases from water by replacing the base with ionic hydrogen, thus giving the water an acid reaction. In this respect they are like the hydrogen zeolites. They are particularly useful for base removal because of their high resistance to the acid washes used in regenerating. The humates however, both in raw coals and lignites and in the products obtained therefrom by sulfating treatments, have to a greater or less extent an undesirable property: that of imparting a brown color to water. The color is not deep or intense, being in most cases more of a hue or a tint than a real color. Coloration or tinting of the water is not desirable. An object achieved in the present invention is the production of stabilized humates not "throwing" (imparting) color to the water undergoing treatment.

We have found that humate preparations stabilized against color throwing and of great utility for softening water and like purposes can be obtained by introducing chromic oxid, $Cr_2O_3$, into the humate molecules in the various preparations made from humic materials. This introduction can be effected in lignite, in coal preparations or in the sulfated or sulfonated preparations mentioned. In all cases a product is obtained of greater stability. The chromium compounds are particularly insoluble in water. Humate preparations containing $Cr_2O_3$ have less tendency to color the water undergoing treatment than other and similar preparations not containing $Cr_2O_3$.

The various humic preparations or "humates" mentioned will abstract $Cr_2O_3$ from saline solutions containing it, such as chromic sulfate or chromic chlorid solutions. We have found chrome alums to be satisfactory reagents. A crystalline salt of the type of

$$K_2SO_4.Cr_2(SO_4)_3.24H_2O,$$

potash chrome alum, is convenient as a source of $Cr_2O_3$. Ammonia chrome alum is available. Chromic salts, such as chromic acetate, either the normal acid, or basic salts, may be used. Chromium salts generally are useful, including compounds which form chromium salts in aqueous solution. Chromates and bichromates may be used in the presence of reducing agents. Chromous salts may be used but they have no particular advantages. It is often advantageous to give the humate material an alkalizing treatment before treating with the chromium salt solution. For this preliminary treatment a weak solution of sodium carbonate or bicarbonate, caustic soda or sodium chlorid is suitable.

Treatment of the humic materials with a chromium solution with or without preliminary alkalization is sufficient to charge the material with $Cr_2O_3$. The time required for this may be shortened by heating the reagent solution during the digestion. Boiling temperatures are suitable. It is advantageous to use a solution containing a low concentration of the chromium salt. A concentration of the order of 2.5 grams $Cr_2O_3$ per liter of solution works well. Stronger solutions than this are effective but when the concentration of $Cr_2O_3$ goes above 12.5 grams per liter there is a tendency for the base exchange power of the product to be somewhat lessened. With a chrome alum solution containing the equivalent of 2.5 grams $Cr_2O_3$ per liter and working at a boiling temperature, the humic material is charged with $Cr_2O_3$ to a substantial extent in about one half to one hour digestion. Ordinarily the relative amount of reagent required is that containing $Cr_2O_3$ equal to 1 or 2 per cent of the humic material to be treated. This gives a product containing from 0.1 to 1 per cent $Cr_2O_3$ held in combination with humic acid; probably as a complex chromium humate. The described treatment which may be called a chromiting, effects an abolition or great reduction in the color-throwing properties of the material chromited; rarely less than a 90 per cent reduction. And a 90 per cent reduction in a faint color is quite sufficient, practically speaking.

The color contamination by the original humic material may be attributed to the formation of complex water-soluble alkali salts of humic acid. The acid salts and the mixed calcium and magnesium alkali salts present in the material are insoluble. With the ordinary humate preparations used in treating water it is noted that in some cases there may be a quite objectionable darkening in hue of the water after the usual regeneration treatment with salt brine. The color is never deep but it may be objectionable. It is these particular preparations which are best chromited by the present process.

In order to accentuate the color throwing properties in testing, it is advantageous to regenerate the humate material with salt solution and then to allow it to stand for a considerable period of time in distilled water. Standing gives time for the color to develop. And the color throwing which would not be noticeable in ordinary rapid work becomes distinctly evident.

A convenient method of determining "color throwing" is to place a bed of the material in a tube and thoroughly regenerate it with a sodium chloride solution and then rinse the material free of sodium chloride and displace the rinse water in the bed completely with distilled water and allow the material to stand in this distilled water for an extended time, which may be either 30 minutes or 24 hours or some other convenient time.

After the material has stood for the desired length of time in distilled water, the distilled water is drained from the bed and its color determined by the standard APHA method. This method is described in "Standard Method for the Examination of Water and Sewage", published by the American Public Health Association, New York city, New York, 7th edition (1933) pages 9 and 10.

Water having a color of 60 or above as determined by this method is considered objectionably discolored by most people. Water having a color below 60 is for all practical purposes, considered as colorless.

For the sake of convenience the 24 hour standing test is referred to as the "long color test" and the 30 minute standing test is designated as the "short color test".

Example I

In a specific example of the present invention, a humic base exchange material was made from lignite by treating commercial steam dried lignite with fuming sulfuric acid at a temperature of about 100–150° C., for a period of about 15 to 30 minutes. The sulfated humate product after separation of excess acid was granulated and screened to a suitable grain size between 14 and 40 mesh. This sulfated lignite product had a high base exchange capacity and the power of substantially complete removal of bases from hard water or from softened water. It, however, showed a color imparting effect of about 525 in the standard test above described on standing for 24 hours after regeneration. This material was treated in a revolving drum with about 15 times its volume of a solution of potassium chrome alum containing about 7 grams chromium sulfate, $Cr_2(SO_4)_3$, per liter or about 2.7 grams $Cr_2O_3$ per liter. The quantity of chrome alum used contained $Cr_2O_3$ equivalent to 1.35 per cent of the weight of the sulfated lignite treated. The drum was revolved about 30 minutes and then live steam was introduced to heat the mixture to the boiling point and the digestion was continued at the boiling temperature for about an hour. The solution was then drained from the solid material and recovered for subsequent use. The chromium treated product was transferred to a wash tank and washed until the effluent wash water was neutral. After draining off the wash water the product was ready for use in treating water. It contained on a dry basis about 1 per cent $Cr_2O_3$.

After being used for softening water by base exchange in the usual way the "long color test" as described above gave a reading of 40, showing a reduction in coloring power of over 92 per cent as compared with a parallel preparation in which the chromiting treatment was omitted. The color value, as explained ante, refers to the color of distilled water at the end of 24 hour contact with the base exchange product.

Example II

In another example of the invention the same sulfated humic material as in Example I was first digested with 20 times its volume of 0.7 per cent sodium bicarbonate solution containing a quantity of sodium bicarbonate equal to 10 per cent of the weight of sulfated lignite. Treatment was for about 25 minutes and then the dilute sodium bicarbonate solution was drained off the material. The material was then treated with a potassium chrome alum solution as described in Example I. The "long color test" reading for distilled water after 24 hours contact was 35 for the chromited material as compared with 525 for the original material, a reduction of over 93 per cent.

Example III

A steam dried South Dakota lignite granulated and screened to 14–40 mesh size was treated with 15 times its volume of a 6 per cent sodium bicarbonate solution at a boiling temperature for about 25 minutes and the sodium bicarbonate solution was run off to a storage tank for reuse on a subsequent batch of lignite. The lignite was then washed thoroughly and treated with 20 volumes of a potassium chrome alum solution containing 6.7 grams $Cr_2O_3$ per liter at a boiling temperature for 30 minutes. After removal of the solution and thorough washing the humate material was used in softening water, regenerated and then tested for its color giving property. The original lignite imparted enough color to water to give a "short color test" reading of 300. The chromited lignite under the same conditions gave a reading of 35.

Example IV

South Dakota lignite of 14–40 mesh size was treated with 5 volumes of a solution containing 5 per cent NaCl and 1 per cent chromium acetate, $Cr(C_2H_3O_2)_3$, (5 grams $Cr_2O_3$ per liter of solution). The treatment was in a closed tank containing a layer of gravel and a suitable distribution device in the bottom, so arranged that the treating solution could be percolated upwards through the lignite. The percolation treatment was continued for 24 hours. After draining and washing the treated lignite to neutrality it was ready for use. The product after being used for softening water with regeneration by a sodium chlorid solution imparted only a very small coloration to water, giving with water a "short color test" reading of 30 as compared with 300 for the untreated material. The base exchange capacity was unchanged.

Example V

Steam dried granular lignite was digested in a revolving drum with 15 volumes of 6 per cent sodium hydroxid solution and with introduction of live steam to bring the solution to the boiling temperature. This alkali treatment continued for about 25 minutes and the lignite was then washed and drained. The alkalized lignite was then treated with 20 volumes of a potassium chrome alum solution containing 6.7 grams $Cr_2O_3$ per liter at a boiling temperature for 30 minutes. After draining and washing the product contained 0.5 per cent $Cr_2O_3$. After use in softening water with common salt regeneration the chromited product gave with water a "short color test" reading of 30 compared with 300 for the original lignite.

While we have described more particularly the use of saline combinations of $Cr_2O_3$, and particularly chrome alum for stabilizing various humate preparations, the purposes of the present invention may be achieved by the use of chromates or bichromates in the presence of a reducing agent; as, for instance, using a chromate with a subsequent or simultaneous treatment with a sulfite. The sulfite reduces $CrO_3$ forming $Cr_2O_3$ and sulfuric acid. The net result is the production of a chromium sulfate. In any of the specific embodiments given, the particular chromic acid salt used may be replaced by an equivalent amount of sodium bichromate with enough sodium sulfite or bisulfite to reduce it.

It will be noted that in every case our preparations are stabilized against color throwing sufficiently to give, upon prolonged contact with distilled water, an APHA color value of well below 60. Thus they can be used in water softening to provide softened water which is practically clear and colorless.

What we claim is:—

1. A process of stabilizing a humic acid base exchange material which comprises digesting granules of such a material in a saline solution containing combined $Cr_2O_3$ for a time sufficient to charge the material with chromic oxid held in combination with contained humic acid.

2. In the process of claim 1, subjecting the humic material to the action of an alkali in solution as a preliminary to the digestion with a chromic salt.

3. The process of claim 1 in which the digestion is with a chrome alum salt.

4. A process of making from lignite a base exchange agent stabilized against imparting color to water which comprises treating a granular lignite material with a solution containing chromic oxid until the material becomes charged with a substantial content of chromic oxid.

5. A process of making a base exchange humate stabilized against imparting color to water which comprises treating a granular sulfonated humate with a solution containing chromic oxid until the humate becomes charged with a substantial content of chromic oxid.

6. In the process of claim 5, subjecting the humate to the action of a dilute solution of an alkali as a preliminary to the treatment with a solution containing chromic oxid.

7. A base exchanging material containing humic acid and a substantial content of chromic oxid chemically combined with humic acid.

8. A base exchanging material containing humic acid, an exchangeable base combined therewith and a substantial content of chromic oxid chemically combined with humic acid.

9. A base exchanging material containing sulphonated humic acid and combined chromic oxid.

10. In the process of claim 1, digesting the granules in a solution containing 2.5 to 12.5 grams $Cr_2O_3$ per liter.

11. In stabilizing a humate material against imparting color to water in water purification, a process which comprises first treating the material with a hot dilute solution of an alkali, washing, and then digesting the alkali treated material in a hot solution of a chromic salt to charge the material with a substantial content of chromic oxid.

12. A process of making a base exchange humate material stabilized against imparting color to water in water purifying which comprises treating granules of the material with a dilute chromate solution in the presence of a reducing agent for a time sufficient to charge the material with chromic oxid.

13. A process of making a base exchange humate material stabilized against imparting color to water in water purifying which comprises treating granules of the material with a dilute solution of a bichromate and an alkali metal sulfite for a time sufficient to charge the material with chromic oxid.

HOWARD L. TIGER.
PAUL C. GOETZ.